(12) United States Patent
Lübbers

(10) Patent No.: US 6,401,532 B2
(45) Date of Patent: Jun. 11, 2002

(54) FILL LEVEL GAUGE

(75) Inventor: Wilhelm Lübbers, Börger (DE)

(73) Assignee: Krohne Messtechnik GmbH & Co. KG (DE)

(*) Notice: Subject to any disclaimer, the term of this patent is extended or adjusted under 35 U.S.C. 154(b) by 0 days.

(21) Appl. No.: 09/851,260

(22) Filed: May 8, 2001

(30) Foreign Application Priority Data

May 15, 2000 (DE) .......................... 100 23 549
Jun. 15, 2000 (DE) .......................... 100 28 807

(51) Int. Cl.$^7$ ............................................. G01F 23/28
(52) U.S. Cl. .................... 73/290 R; 73/290 V; 324/637
(58) Field of Search ........................ 73/294, 290, 227, 73/618, 653, 632, 620, 340; 340/618; 342/124; 324/637, 642; 343/772, 878, 888; 333/32, 254, 908

(56) References Cited

U.S. PATENT DOCUMENTS

| | | | |
|---|---|---|---|
| 4,624,140 A | * 11/1986 | Ekchian et al. | 73/304 |
| 4,670,754 A | * 6/1987 | Zacchio | 342/124 |
| 5,148,593 A | * 9/1992 | Walter | 29/600 |
| 5,351,036 A | * 9/1994 | Brown et al. | 340/618 |
| 5,495,218 A | * 2/1996 | Erb et al. | 333/248 |
| 5,872,494 A | 2/1999 | Palan et al. | |
| 5,877,663 A | * 3/1999 | Palan et al. | 333/252 |
| 6,278,411 B1 | * 8/2001 | Ohlsson et al. | 343/772 |

FOREIGN PATENT DOCUMENTS

| | | | |
|---|---|---|---|
| DE | 94 12243.1 | 9/1994 | |
| DE | 9412243 | * 11/1994 | ............ 23/28 |
| DE | 196 17 963 A1 | 11/1997 | |
| DE | 196 41 036 C2 | 4/1998 | |
| EP | 0 922 942 A1 | 6/1999 | |

* cited by examiner

Primary Examiner—Hezron Williams
Assistant Examiner—Andre' Jackson
(74) Attorney, Agent, or Firm—Cesari and McKenna, LLP

(57) ABSTRACT

A fill level gauge operating by the radar principle and preferably used for measuring the fill level of a liquid or fluid in a container incorporates a microwave generator for generating a microwave signal, a waveguide for conducting the microwave signal, a horn radiator serving as a transmitting and/or receiving antenna, an impedance transformer, and a connecting flange, where the horn radiator is positioned on the near side of the connecting flange facing the liquid and the impedance transformer extends at least partially into the opening of the horn radiator. An obturator plate is designed as an integral extension of the impedance transformer and is positioned between the horn radiator and the connecting flange. This design permits easy replacement of the impedance transformer while providing a secure seal at the junction between the horn radiator and the impedance transformer.

5 Claims, 2 Drawing Sheets

FILL LEVEL GAUGE

Figure 1:
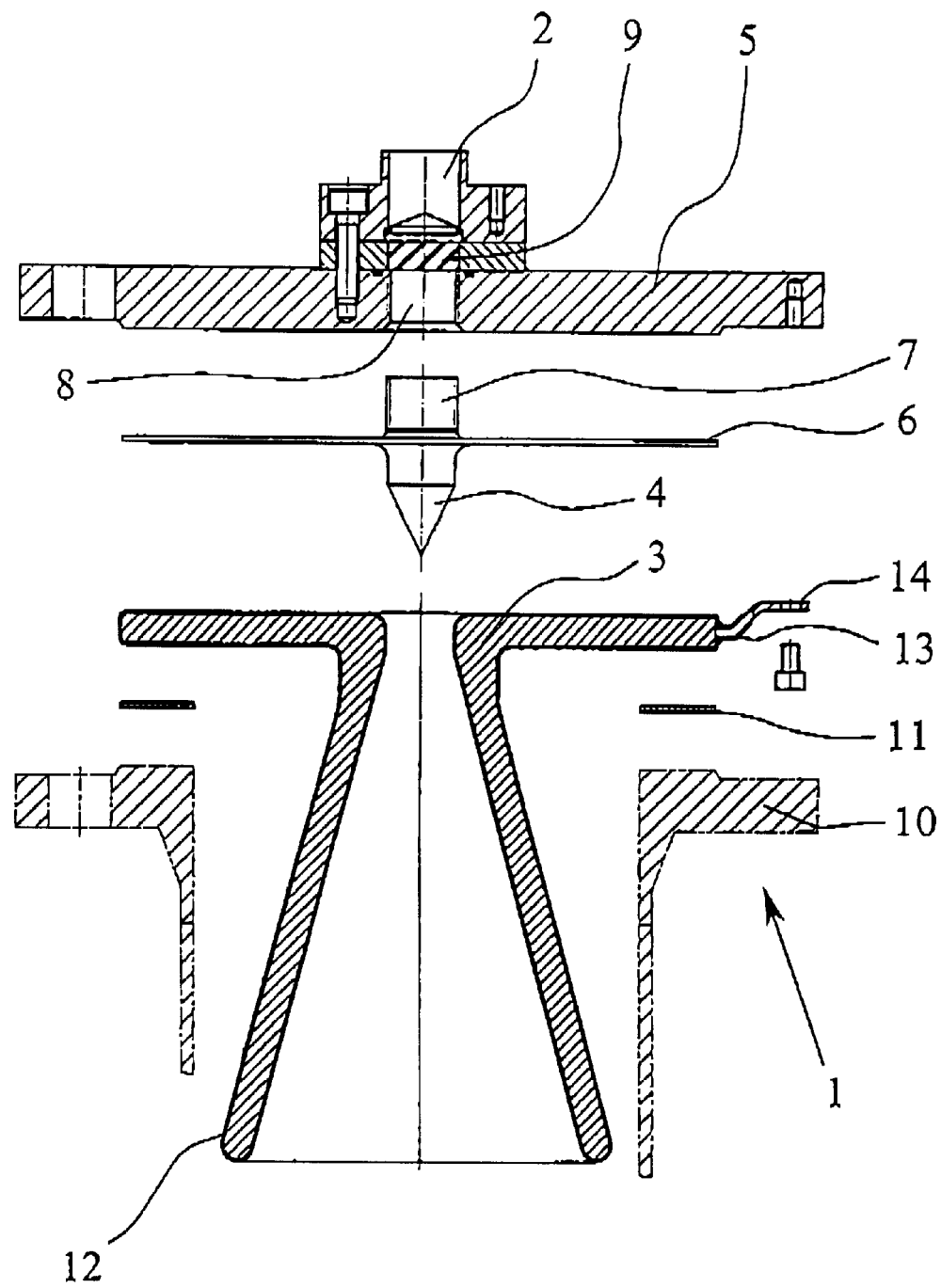

This invention relates to a fill level gauge, employing the radar principle, preferably for gauging the fill level of a liquid in a container, incorporating a microwave generator for generating a microwave signal, a waveguide for channeling the microwave signal, a horn radiator functioning as a transmitter and/or receiver, an impedance transformer, and a connecting flange, whereby the horn radiator is positioned on the side of the connecting flange facing the liquid and the impedance transformer extends at least partially into the opening of the horn radiator. A fill level gauge of this type has been described in the German utility patent 94 12 243.

Apart from the traditional mechanical float- or feeler-type fill level gauges, fill level gauges have been in existence which are based on a principle whereby an oscillator transmits oscillatory waves, an oscillatory-wave detector captures the oscillation waves reflected off the surface of a liquid in a container, and the detected run-time of the oscillation waves serves as a measure for determining the fill level of the liquid in the container. In this connection, reference is made to the German patent disclosures 42 33 324, 43 27 333 and 44 19 462.

Fill level gauges of the type mentioned are usually referred to as non-contact fill level gauges since neither the oscillator or oscillatory-wave detectors nor the transmitter or receiver need to be in physical contact with the fluid. In any event, the transmitter and the receiver do not touch the liquid unless the container is overfilled.

All of these earlier, generally non-contact fill level gauges work with internally transmitted oscillatory waves which are reflected off the surface of the liquid whose fill level is to be determined. Among these conventional fill-level determination methods one distinguishes between those which measure the phase shift between the transmitted and the reflected i.e. detected waves, and those which directly measure the runtime of the oscillatory waves. In turn, runtime-measuring systems are broken down into fill level gauges which measure the runtime on the basis of oscillation waves with pulse-modulated amplitudes versus those which measure the runtime on the basis of frequency-modulated oscillatory waves. The latter are also known as fill level gauges employing FMCW technology.

The non-contact fill level gauges to be addressed, operating by the radar principle, typically use a horn radiator as the transmitting and/or receiving aerial. A waveguide generally serves to feed the microwave signal, emanating from a microwave generator, to the horn radiator. To permit the microwave signal traveling through the waveguide to be transmitted via the horn radiator into the container holding the liquid whose fill level is to be determined, an impedance transformer is commonly used—also referred to in the German utility patent 94 12 243 as a connecting element—which is designed and dimensioned in such fashion that it assures an optimally interference-free transition of the microwave signal from the waveguide to the horn radiator with a minimum of reflections at the junction. For that purpose, the impedance transformer usually extends at least partially into the opening of the horn radiator. That, however, creates a problem insofar as the junction between the impedance transformer and the horn radiator must be sealed if the fill level gauge is to be used in a container that is sealed from its environment. This is necessary especially in cases where the liquid is a chemically aggressive or corrosive substance, a high-temperature liquid or a high-pressure fluid.

To solve the problem of having to seal the junction between the impedance transformer and the horn radiator, the German utility patent 94 12 243 proposes to coat the entire surface of the horn radiator and the impedance transformer facing the liquid in the container with a chemically resistant layer which also serves as a seal. As an alternative, it provides for the use of an array of O-ring seals and gaskets between the impedance transformer and the horn radiator. These, however, are undesirable solutions in that the impedance transformer would be solidly connected to the horn radiator and/or an additional system of seals between the impedance transformer and the horn radiator would be required.

It is therefore the objective of this invention to provide a fill level gauge of that type, employing the radar principle, in which the impedance transformer is easily removable and the seal between the horn radiator and the impedance transformer can be securely established in simple fashion.

The fill level gauge according to this invention, designed to solve the aforementioned problem, is characterized by an obturator plate which is positioned between the horn radiator and the connecting flange and which is an integral part of the impedance transformer.

As the fill level gauge is mounted on the container, i.e. at the time the connecting flange of the fill level gauge is fastened to the corresponding flange on the container and the flange mounting screws are tightened, a seal is created between the impedance transformer and the horn radiator by the pressure applied on both sides of the obturator plate. The obturator plate forms a tight seal between the connecting flange and the horn radiator while at the same time no liquid can escape from the container through the junction between the impedance transformer and the horn radiator since the obturator plate is an integral extension of the impedance transformer. As in the case of conventional fill level gauges, a proper seal between the horn radiator and the flange of the container is established by means of gaskets placed between the contact surfaces of the container flange and the horn-radiator flange.

The fact that the obturator plate is an integral part of the impedance transformer not only provides a secure seal between the horn radiator and the impedance transformer but, as a significant advantage of this invention, it also permits easy interchanging of a deinstalled impedance-transformer/obturator-plate assembly without having to worry about the above-mentioned sealing problems.

To serve its sealing purpose the obturator plate must be in continuous, flush contact around its entire perimeter with the contact surface of the connecting flange and with the contact surface of the horn radiator that extends parallel to the contact surface of the connecting flange. For all practical purposes, the obturator plate need not cover more than a part of the contact surface of the connecting flange and the contact surface of the horn radiator. However, in a preferred, enhanced embodiment of this invention, the obturator plate covers the contact surface of the horn radiator in its entirety. This particularly large coverage assures an even better sealing of the junction between the horn radiator and the impedance transformer, allowing even fluids with especially high pressures to be stored in the container without having to be concerned about the possibility of such fluids leaking to the outside in the area in which the fill level gauge is connected to the container.

In general, the impedance transformer and the obturator plate may consist of any dielectric material that offers adequate sealing properties for the intended use of the fill level gauge. However, in a preferred embodiment of this invention, the obturator plate and the impedance transformer consist of a chemically resistant plastic, preferably PTFE.

When the obturator plate and the impedance transformer are made of PTFE, one can be certain that the seal between the horn radiator and the impedance transformer will not spring a leak due to a corrosive effect of aggressive chemicals on the obturator plate.

In another preferred, enhanced embodiment of this invention, the side of the obturator plate opposite the impedance transformer is provided with a waveguide insert which is an integral part of the obturator plate and serves to couple the microwave signal into the impedance transformer. The microwave signal could be coupled into the impedance transformer without such a waveguide insert but that would entail more significant losses or interferences in the microwave signal at the junction. In this preferred embodiment of the invention, the waveguide insert as well is preferably made of a chemically resistant plastic and again preferably of PTFE.

The horn radiator usually consists of a metal such as stainless alloy steel, tantalum, titanium or aluminum. This invention allows the use of a metal horn radiator without any coating. However, according to a preferred embodiment of the invention, the entire surface of the horn radiator that is in contact with the inside of the container is coated with a dielectric. This assures particularly good protection of the horn radiator against corrosion. The dielectric layer on the horn radiator should not be more than 2 mm thick, to prevent charges on the dielectric that would be high enough to be in conflict with existing explosion-protection regulations. Preferred dielectric materials include ceramic, plastic and preferably PTFE, PFA, FEP or PVDF, as well as enamel. At this juncture it should be stressed that, while the impedance transformer could on its part be coated with enamel or other materials, any such enamel or other coating of the impedance transformer is not needed for sealing purposes.

According to a preferred embodiment of this invention, the coating or enameling process in the case of a horn radiator with an enameled surface includes the creation of an eyelet serving as a ground connection for the horn radiator. This not only greatly simplifies the grounding of the horn radiator by obviating the need for drilling a hole into the horn radiator, but it also provides a very effective means for particularly good grounding of the electric charges produced on the coated surface of the horn radiator.

In connection with the enamel-coating of the horn radiator, it should also be pointed out that the problems encountered with prior-art enameled horn radiators, meaning a peeling or chipping of the enamel layer due to impinging pressures, are avoided by this invention in that sealing elements are provided not only on one side, but on both sides of the horn radiator, which elements are sufficiently resilient to absorb the pressures bearing on the enamel layer. Therefore, if the connecting flange of the fill level gauge in this embodiment is properly attached to the flange of the container, there should be no peeling or chipping of the enamel coating.

Figure 2:
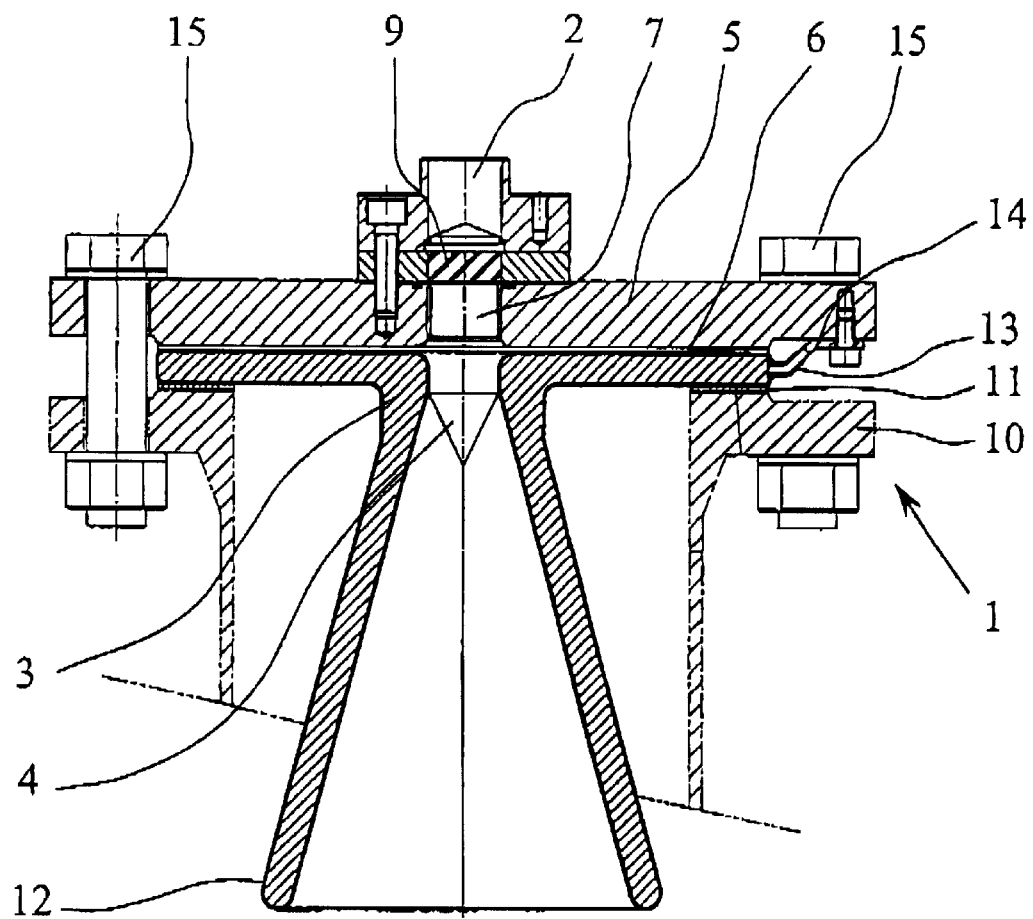

There are numerous ways in which the design of the fill level gauge according to this invention can be implemented and further enhanced. In this context, reference is made to the dependent claims and to the following detailed description explaining a preferred design example of this invention with the aid of the drawings, in which:

FIG. 1 is an exploded cross sectional view of the antenna system of a fill level gauge according to a preferred embodiment of the invention; and FIG. 2 is a cross sectional view of the assembled antenna system of a fill level gauge according to the preferred embodiment of the invention.

FIG. 1 merely shows the part of a fill level gauge according to a preferred embodiment of this invention which is of significance in terms of the invention, that being the antenna system of the fill level gauge that is to be mounted on a container 1. In other words, the figures do not illustrate a microwave generator of the fill level gauge for generating a microwave signal, nor a measuring transducer for receiving the reflected microwave signals.

As shown in the figures, the fill level gauge incorporates a waveguide 2 into which the microwave signal emanating from the microwave generator is coupled and which channels the microwave signal from there. The fill level gauge further includes a stainless-steel horn radiator 3 which, in the preferred embodiment of the invention here described, operates as both a transmitting and receiving antenna. Also incorporated are an impedance transformer 4 and a connecting flange 5. The waveguide 2 not only conducts the microwave signal emanating from the microwave generator to the connecting flange 5 but, since the horn radiator also functions as a receiving antenna, it also channels the microwave signal reflected by the liquid and received by the horn radiator 3 to the measuring transducer, not illustrated. The waveguide 2 leading from the microwave generator and from the measuring transducer is positioned on the far side of the connecting flange 5 away from the liquid while the impedance transformer 4 is located on the near side of the connecting flange 5 facing the liquid.

As can be seen in FIG. 1, the impedance transformer 4, an obturator plate 6 and a waveguide insert 7 constitute one integrated unit. The waveguide insert 7 leads to the waveguide 2 by way of a central bore 8, so that the coupling of the microwave signal into the impedance transformer 4 takes place from the waveguide 2 via a waveguide window 9 located on the far side of the connecting flange 5 away from the liquid and from there via the waveguide insert 7.

The obturator plate 6 serves as a seal between the contact surface of the connecting flange 5 of the fill level gauge facing the liquid and the contact surface of the horn radiator 3 away from the liquid, while the sealing element between the contact surface of the horn radiator 3 facing the liquid and the contact surface of a flange 10 of the container is in the form of an O-ring gasket 11.

The horn radiator 3 of the fill level gauge illustrated in FIGS. 1 and 2 is enamel-coated over its entire surface. The enamel layer 12 on the waveguide 3 is 2 mm thick. For easier production, the horn radiator 3 in the preferred embodiment of the invention here described is enamel-coated over its entire surface. For good corrosion protection, however, it suffices to provide enamel coating on only those surface sections of the horn radiator 3 which make contact with the inside of the container 1.

In the process of enamel-coating the horn radiator an eyelet 13 is usually produced. For the fill level gauge according to the preferred embodiment of the invention as illustrated, the process was controlled in such fashion that the eyelet 13 would be produced at the outer perimeter of the connecting plate, meaning the part of the horn radiator 3 that is attached between the connecting flange 5 of the fill level gauge and the flange 10 of the container 1. That allows the eyelet 13 to be used as a direct grounding contact for the enamel-coated horn radiator 3 by means of an electrical conductor 14 attached to the eyelet 13 and run to the connecting flange 5 of the fill level gauge where it is fastened with a screw.

It will be self-evident that the above-described use of the eyelet of the enamel layer is not limited to the fill level gauge according to this invention but can be employed with all fill level gauges which are provided with an enamel-coated antenna that is to be grounded.

What is claimed is:

1. A fill level gauge, operating by the radar principle, and preferably used for measuring the fill level of a liquid or fluid in a container, said gauge comprising an enamel-coated antenna, that is to be grounded, wherein an eyelet created in the process of coating the antenna with enamel constitutes a contact for grounding the antenna.

2. The fill level gauge as in claim 1, wherein only those surfaces of the antenna are enamel-coated which make contact with the inside of the container.

3. The fill level gauge as in claim 1, wherein the entire surface of the antenna is enamel-coated.

4. The fill level gauge as in any of claims 1 to 3, wherein the antenna is a horn radiator.

5. The fill level gauge as in any of claims 1 to 3, wherein the antenna is a horn radiator having a connecting plate for connecting the horn radiator to a flange, and the eyelet is produced at the outer perimeter of the connecting plate.

* * * * *